April 19, 1938.    B. W. BAYLISS    2,114,518
GRUBBING BLADE FOR RAKES
Filed Nov. 16, 1936

INVENTOR.
Ben W. Bayliss
BY
ATTORNEY.

Patented Apr. 19, 1938

2,114,518

UNITED STATES PATENT OFFICE 2,114,518

GRUBBING BLADE FOR RAKES

Ben W. Bayliss, Spokane, Wash.

Application November 16, 1936, Serial No. 111,061

6 Claims. (Cl. 55—10)

This invention relates to a grubbing blade for a rake and one object of the invention is the provision of a blade so constructed that it may be very easily applied to a rake of a conventional construction and used for removing dandelions and other weeds from a lawn.

Another object of the invention is to so form the blade that when it is applied to a rake it will have a lower portion projecting downwardly from teeth of the rake and so formed that while the weeds may be easily removed, teeth formed along the lower edge of the blade will not be liable to dig into the soil while cutting off dandelions or other weeds.

Another object of the invention is to provide the blade with clamping members so formed that the blade will be very firmly held in gripping engagement with a rake head when applied thereto and to also so form the clamping members that the blade may be applied to either a rake head having a handle engaging shank intermediate its width or to a rake head having a handle engaging yoke consisting of arms extending rearwardly from ends of the rake head.

The invention is illustrated in the accompanying drawing, wherein—

Figure 2:
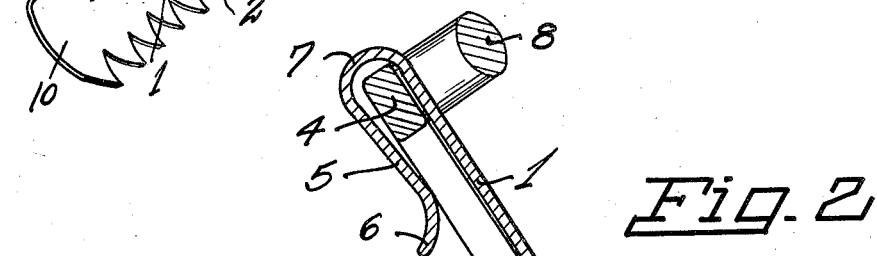
Figure 2 is a sectional view upon an enlarged scale taken along the line 2—2 of Figure 1.
Figure 3:
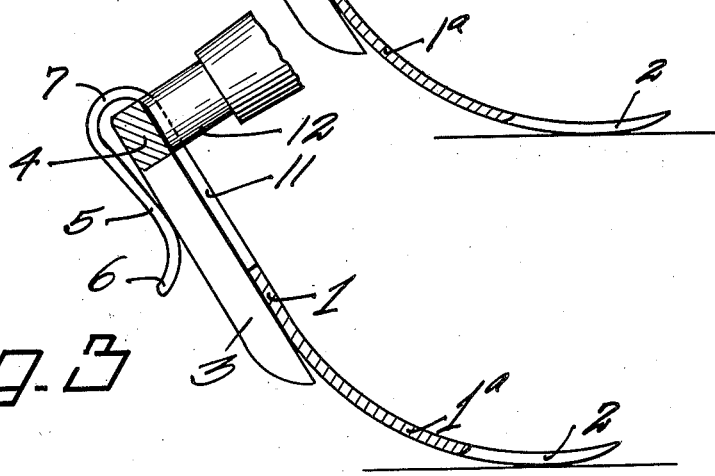
Figure 3 is a view similar to Figure 2 showing the blade applied to a rake having its head provided with a handle engaging shank instead of a yoke.

The improved grubbing blade 1 constituting the subject-matter of this invention is formed of strong sheet metal such as sheet steel and has its lower edge portion serrated to provide teeth 2 which taper to points at their free ends and are sharpened so that when the blade is in use dandelions and other weeds engaged by the teeth may be cut off at their roots by contact with the sharp edges of the teeth and carried towards the operator by the solid portion of the blade above the teeth. The lower portion 1ª of the blade and the teeth are curved vertically, as shown in Figures 2 and 3, so that when the blade is applied to a rake with the flat upper portion of the blade bearing against the teeth 3 and the head or cross bar 4 of the rake, the curved portion of the blade will extend forwardly from the lower ends of the rake teeth and the teeth of the blade be disposed substantially horizontal and parallel to the surface of the ground. Therefore, the rake and the blade carried thereby may be drawn forwardly and the dandelions or other weeds will be cut off at the ground by the rearwardly converging side edges of the adjoining teeth of the blade without the points of the teeth catching in the ground and spoiling the appearance of a lawn by digging up the ground or uprooting the grass.

Figure 1:
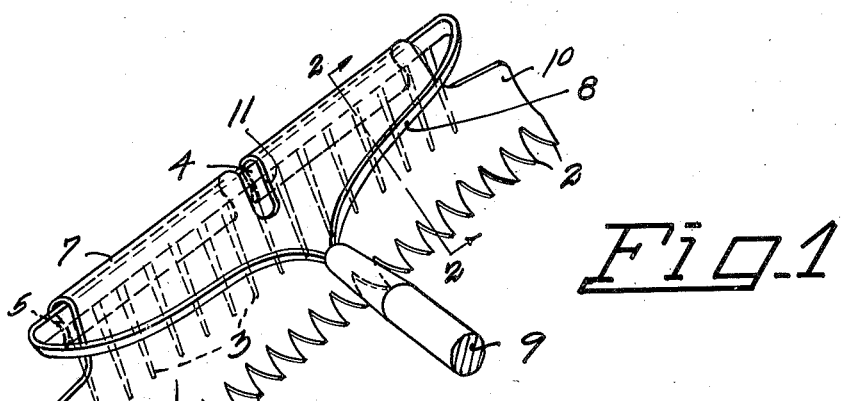
Figure 1 is a perspective view showing the improved grubbing blade applied to a rake of a conventional construction.

The blade is to be detachably applied to a rake of a conventional construction and in order to do so its upper portion which is of reduced width has been bent to form a flange or jaw 5 having a rearwardly curved lip 6 along its lower edge so that the clamp formed by the jaw 5 and the upper portion of the blade may be easily forced downwardly into straddling relation to the rake and firmly grip the same. It should also be noted that the bridge portion 7 of the clamp formed by bending the upper portion of the blade rearwardly is curved or arcuate transversely and, therefore, a person may apply pressure to this bridge portion to force the clamp downwardly into gripping engagement with the rake without injury to his hand. The fact that the jaw terminates upwardly from the lower ends of the teeth of the rake an appreciable extent disposes their lower ends above the surface of the ground when the blade is in use and there will be no danger of the lower end of the jaw catching against the ground during forward movement of the rake and causing the blade to be shifted upwardly out of its proper position and possibly dislodged from the rake. By forming the blade with a reduced upper portion, this upper portion can be passed upwardly between arms 8 of a yoke which connect the rake head with the handle 9 until the jaw is above the rake and then force the blade downwardly to move the clamp into straddling relation to the rake for gripping the same. It should also be noted that this formation permits the blade to be provided with end portions 10 which project beyond ends of the rake, thus permitting the blade to be of greater width than the rake and also providing offset portions defining shoulders adapted to engage united ends of the rake head and the arms of the yoke and limit upward movement of the blade through the yoke. By providing these shoulders, the blade can only have limited upward movement and if it should accidentally become dislodged from the rake while in use, it will be retained in front of the rake and drawn forwardly with the rake to a position in which it can be easily picked up and replaced upon the rake. Midway the width of the clamp there has been provided a cut leading from the lower edge of the jaw 5 and extending into the upper portion of the inner jaw defined by the upper portion of the blade, as shown in Figure 3. This provides the blade with a passage 11 to receive the shank 12 of a rake when the blade is applied to a rake having a single shank midway its width instead of a rearwardly extending yoke, as shown in Figures 1 and 2. The blade may, therefore, be applied to either form of rake and easily removed when no longer needed.

Having thus described the invention, what is claimed as new is:

1. A grubbing blade comprising a plate of resilient sheet metal having its upper portion folded upon itself to form a clamp adapted to straddle the upper portion of a rake head and detachably mount the same against the front face of the rake head.

2. A grubbing blade comprising a sheet metal plate having teeth along its lower edge, the upper portion of the plate being bent rearwardly and downwardly to provide a jaw adapted to grip a rake disposed between the jaw and the upper portion of the plate and detachably mount the blade in front of the rake.

3. A grubbing blade comprising a sheet metal plate having its lower portion curved forwardly, the upper portion of the blade being provided with a jaw adapted to grip the head of a rake and mount the blade against front faces of its teeth with the curved lower portion of the blade projecting forwardy from lower ends of the teeth.

4. A grubbing blade comprising a sheet metal plate having teeth along its lower edge and having its upper portion bent rearwardly and downwardly to provide a rear jaw for a clamp adapted to straddle the head of a rake, the lower portion of said jaw being formed with a rearwardly extending lip to guide the jaw back of a rake head into position to grip the rear face thereof.

5. A grubbing blade comprising a sheet metal plate having its upper portion of reduced width and bent rearwardly and downwardly to provide a clamp adapted to straddle the head of a rake between rearwardly extending arms of a handle-engaging yoke of the rake head and consisting of a rear jaw formed by the downwardly bent portion of the plate and a transversely arcuate bridge at the upper end thereof connecting the rear jaw with a front jaw formed by a portion of the plate spaced forwardly from the rear jaw.

6. A grubbing blade comprising a sheet metal plate having its upper portion bent rearwardly and downwardly to provide a jaw spaced rearwardly from an upper portion of the blade serving as a front jaw and connected with the rear jaw by a bridge, a passage being formed vertically through the jaws midway the width of the blade and opening through the bridge whereby a rake head may be disposed between and gripped by the jaws with a shank of the rake head extending through the passage.

BEN W. BAYLISS.